United States Patent [19]
McVeigh

[11] Patent Number: 6,055,274
[45] Date of Patent: Apr. 25, 2000

[54] METHOD AND APPARATUS FOR COMPRESSING MULTI-VIEW VIDEO

[75] Inventor: Jeffrey S. McVeigh, Portland, Oreg.

[73] Assignee: Intel Corporation, Santa Clara, Calif.

[21] Appl. No.: 09/000,734

[22] Filed: Dec. 30, 1997

[51] Int. Cl.[7] .................................................. H04B 1/66

[52] U.S. Cl. ............................ 375/240; 348/43; 348/47; 348/48; 348/416

[58] Field of Search ............................ 375/240; 348/43, 348/47, 48, 416; 382/243

[56] References Cited

U.S. PATENT DOCUMENTS

| | | | |
|---|---|---|---|
| 5,179,441 | 1/1993 | Anderson | 348/43 |
| 5,652,616 | 7/1997 | Chen | 348/43 |
| 5,886,736 | 3/1999 | Chen | 348/43 |

OTHER PUBLICATIONS

Tzovaras, et al. "Object–Based Coding of Stereo Image Sequences Using Joint 3–D Motion Disparity Compensation", IEEE Transactions of Circuits and Systems for Video Technology, vol. 7, No. 2, Apr. 1997.

*Primary Examiner*—Howard Britton
*Attorney, Agent, or Firm*—Blakely, Sokoloff, Taylor & Zafman LLP

[57] ABSTRACT

The invention in one embodiment is an apparatus for compressing multi-view video data from a first view and a second view. The apparatus comprises a first encoder receiving a first set of video data from the first view, encoding the first set of video data and transmitting the encoded first set of video data. The apparatus further comprises a second encoder that includes an estimator and a codec. The estimator receives the encoded first set of video data from the first encoder, receives a second set of video data from the second view, generates a pixel-based disparity vector field from the received first and second sets of video data, and transmits the disparity vector field. The codec receives the vector disparity field from the estimator, encodes the received vector disparity vector field with motion compensated disparity, and transmits the encoded disparity vector field.

18 Claims, 5 Drawing Sheets

METHOD AND APPARATUS FOR COMPRESSING MULTI-VIEW VIDEO

BACKGROUND OF THE INVENTION

1. Field of the Invention

This invention relates generally to video compression and, more particularly, to a method and apparatus for compressing multi-view video.

2. Description of the Related Art

Multi-view video generates a single representation of a scene from multiple views of that scene. Each view consists of a number of still images captured one after another by a camera. The views are obtained from separate cameras positioned at distinct view points. The cameras that capture the views are typically positioned closely to one another. This proximity ensures a high degree of similarity between corresponding frames captured by different cameras. The term "corresponding frames" in this context identifies frames from different views whose images were captured at the same time.

Perhaps the most common example of multi-view video is stereoscopic video. To create stereoscopic video, two horizontally separated cameras capture still images of the scene. When the stereoscopic video is displayed, the information in the video from each view is directed to the appropriate eye of the viewer. This results in added realism through perceived depth perception, adds realism, and improves the viewer's scene understanding. Some implementations of multi-view video incorporate information from three, four, or more cameras to amplify these benefits.

One significant problem associated with multi-view video relative to traditional, single-view video, is the additional transmission bandwidth it requires. "Bandwidth" is the amount of data that can be transmitted in a fixed amount of time. Cameras typically capture a still image in analog form and then convert it to digital form. In the conversion, the still image in the frame broken down into "pixels," or picture elements. Each pixel in the frame is then converted to digital form and represented by one or more bits.

The number of pixels in any particular frame will depend on the resolution of the video standard being employed using the common VGA standard, there might be anywhere from 307,200 pixels per frame down to 64,000 pixels per frame. The single-view video captured by an individual camera will typically comprise a series of frames, perhaps as many as sixty per second. Multiplied by the number of cameras, the multi-view video system must handle a lot of data.

Most multi-view video systems therefore use some form of video compression. "Compression" is a technique by which a large amount of information can be conveyed by transmitting a fewer number of bits representative of the larger amount of information. For example, there typically will be only small variations in the content between successive frames captured by the same camera. This system could therefore transmit the initial frame and then subsequently transmit only the differences between the successive frames. The high similarity between corresponding frames captured by separate cameras in a multi-view video system may also be highly similar, and the digital information extracted therefrom highly redundant. Again, this redundancy can be exploited to compress the amount of data the multi-view video system must process.

Current compression techniques for multi-view video identify the video from one of the cameras as an independent view and a second video from a second camera as a dependent view. The independent video is encoded. The dependent view video is then encoded using what are called "disparity estimation" and "disparity compensation" techniques based on the encoded independent view video data.

Current multi-view video compression techniques use a "block based" disparity estimation approach. Typically, the blocks are sixteen pixels by sixteen pixels such that each of the pixels in the sixteen by sixteen pixel block are assigned the same disparity estimation. Thus, these techniques do not exploit the temporal redundancy of the disparity vector fields, result in poorer coding efficiency, and results in the inability to accurately perform viewpoint interpolation.

The present invention is directed to overcoming, or least reducing the effects of, one or more of the problems set forth above.

SUMMARY OF THE INVENTION

The invention in one embodiment is an apparatus for compressing multiview video data from a first view and a second view. The apparatus comprises a first encoder receiving a first set of video data from the first view, encoding the first set of video data and transmitting the encoded first set of video data. The apparatus further comprises a second encoder that includes an estimator and a codec. The estimator receives the encoded first set of video data from the first encoder, receives a second set of video data from the second view, generates a pixel-based disparity vector field from the received first and second sets of video data, and transmits the disparity vector field. The codec receives the vector disparity field from the estimator, encodes the received vector disparity vector field with motion compensated disparity, and transmits the encoded disparity vector field.

BRIEF DESCRIPTION OF THE DRAWINGS

Other objects and advantages of the invention will become apparent upon reading the following detailed description and upon reference to the drawings in which.

Figure 1:
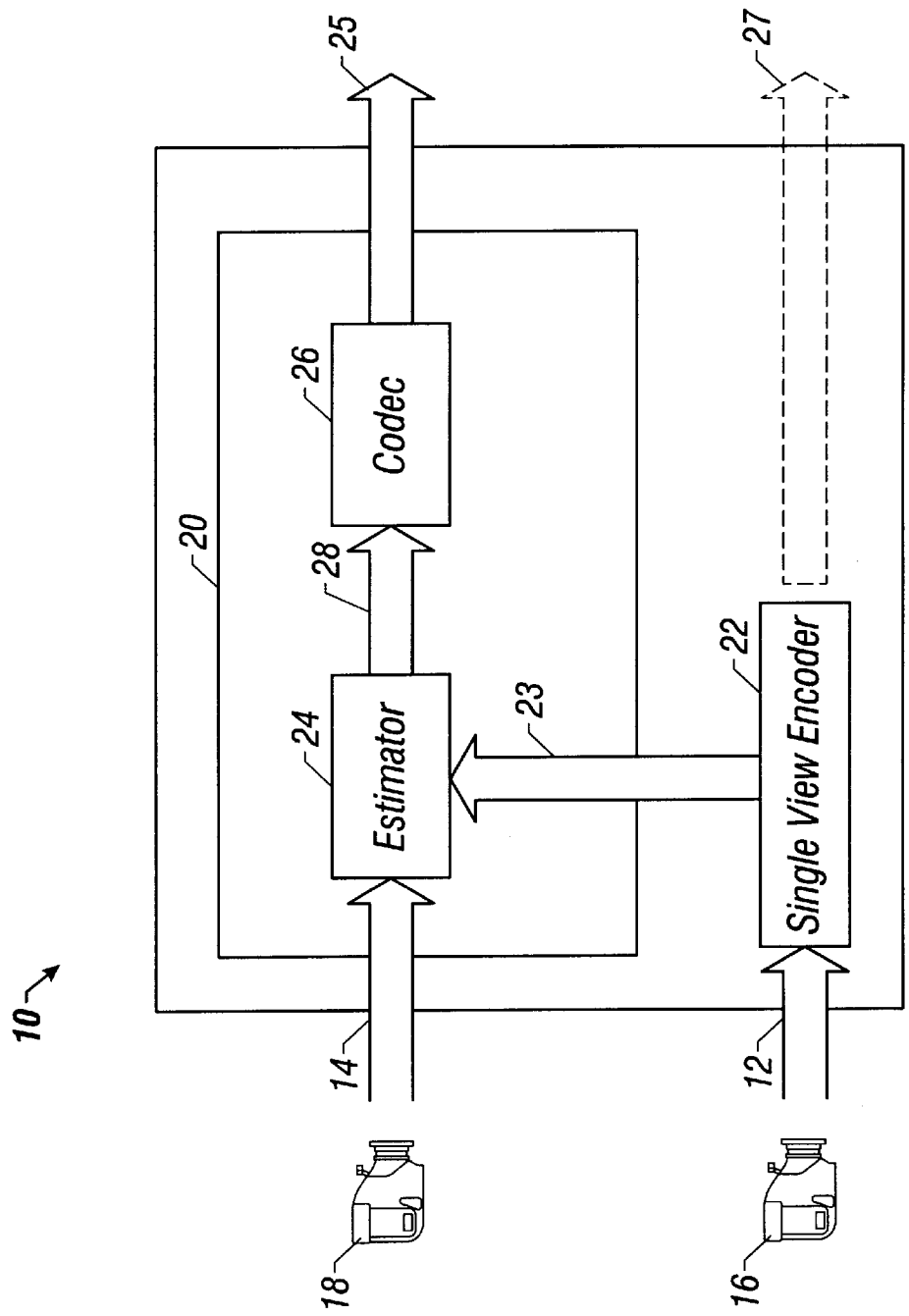
FIG. 1 illustrates one embodiment of an apparatus for compressing multi-view video in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

FIG. 1 illustrates one embodiment of an apparatus 10 constructed in accordance with the invention. The apparatus 10 receives an independent view data stream 14 and dependent data stream 12 from cameras 18 and 16. The cameras 16 and 18 may in a particular embodiment illustrated are video cameras, but in some embodiments may be still cameras. The data streams 12 and 14 are typically digital, the analog to digital conversion being performed by the cameras 16 and 18. Again, however, the data streams 12 and 14 in other embodiments may be analog and the apparatus 10 may need to perform the analog to digital conversion.

Cameras 16 and 18 are typically horizontally displaced only a short distance with little or no vertical displacement relative to one another. However, the cameras 16 and 18 typically will also be positioned far enough apart so that their views are "distinct." The relative placement is generally determined by techniques readily known and well used by those in the art to create the desired effects of realism and depth with significant temporal and content redundancy. However, this may not always be the case in all embodiments. Some embodiments may include more or fewer cameras with more or less horizontal displacement and perhaps even vertical displacement.

The apparatus 10 itself comprises a disparity compensated encoder 20 and a single-view encoder 22. The apparatus 10 produces encoded stereoscopic video but the invention is not so limited. The encoded stereoscopic video data is transmitted via channel 25. The encoded data may be, depending upon the embodiment, multiplexed with other video data, stored, decoded for display, or decoded for further processing.

The single-view encoder 22 encodes the independent view data stream 12 using any known single-view video compression algorithm. Single-view video compression algorithms are well known in the art and any such algorithm would be suitable. For instance, the compression algorithm in the MPEG-4 video standard promulgated by the Motion Pictures Expert Group ("MPEG") would be acceptable. The single-view encoder 22 then outputs the encoded first set of video data through the channel 23. The single view encoder 22 may also, in some embodiments, output the encoded first set of video data from the apparatus 10, as indicated by the channel 27 in ghosted lines.

The disparity compensated encoder 20 includes an estimator 24 and a codec 26. The estimator 24 of the embodiment illustrated is a pixel-based disparity estimator that receives the encoded first set of video data from the single-view encoder 22, receives a second set of unencoded video data from the second view 14, and generates therefrom a pixel-based disparity vector field as described further below. This vector field is then transmitted to the codec 26, which in the embodiment illustrated is a motion compensated disparity vector encoder/decoder, through the channel 28. The codec 26 then encodes each vector component of the received vector disparity vector field with motion compensated disparity, and outputs the encoded disparity vector field through the channel 25.

Figure 2A:
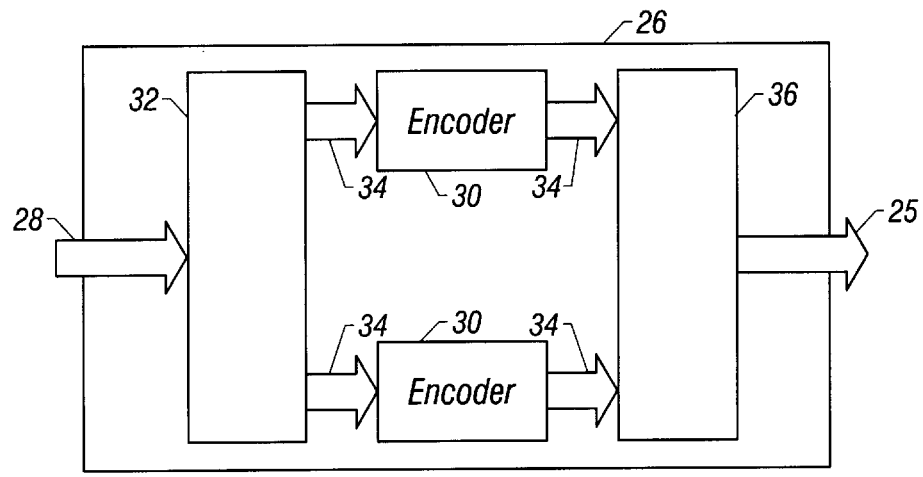
FIGS. 2A and 2B illustrate one embodiment of the motion compensated disparity vector encoder/decoder in FIG. 1.
Figure 2B:
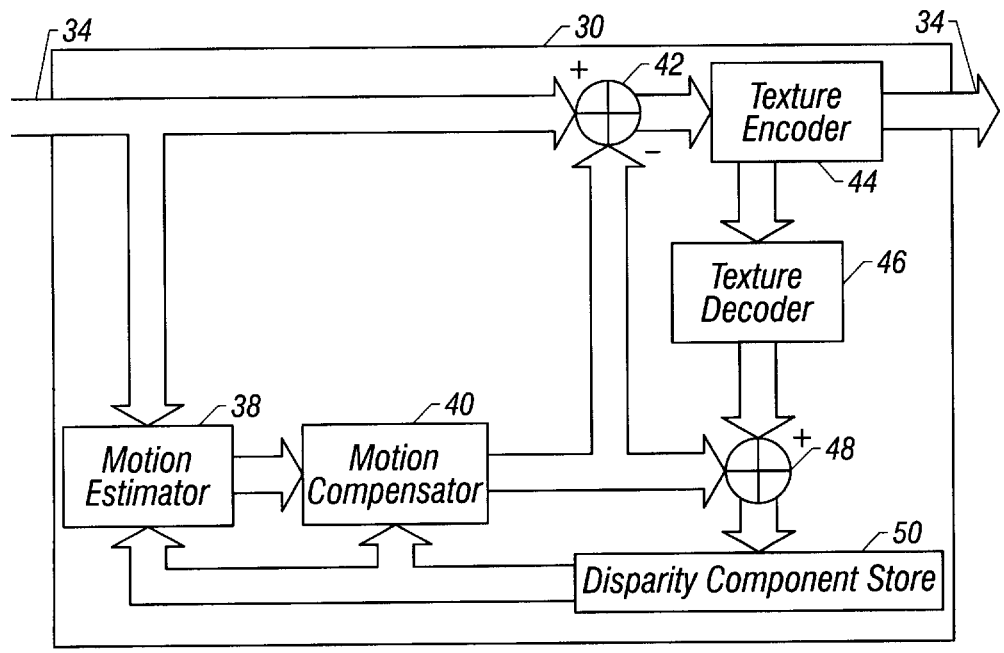

FIGS. 2A and 2B illustrate one embodiment of the codec 26 shown in FIG. 1. The codec 26 receives the disparity vector field through channel 28 from the estimator 24. The codec 26 includes two encoders 30 illustrated in greater detail in FIG. 2B discussed below. The codec 26 receives the disparity vector field from the estimator 24 (in FIG. 1) in a single channel 28 whereupon the components of the disparity vector field are split by a splitter 32 into separate channels 34, each leading to a encoder 30. The encoded vector components are then transmitted to their respective channels 34 to the combiner 36 that formats them into a single data stream output over the channel 25.

FIG. 2B details one particular embodiment of an encoder 30. Each encoder 30 comprises a motion estimator 38, a motion compensator 40, an adder 42, a texture encoder 44, a texture decoder 46, an adder 48, and a disparity component store 50. The motion estimator 38 and the motion compensator 40 predict the motion of the current frame from the single, original disparity vector component and from a reconstructed component from the previous frame stored in the disparity component store 50. The prediction is summed with the original disparity component by adder 42 and the is residual encoded by texturing encoder 44 for output again into channel 34. The encoded residual is also transmitted to texture decoder 46. The texture decoder 46 decodes the residual and transmits the reconstructed disparity component to the adder 48, whereupon it is added to the prediction from the motion compensator 40. The sum of the decoded residual and original prediction is then stored in disparity component store 50 for use in the next frame's prediction.

Figure 3:
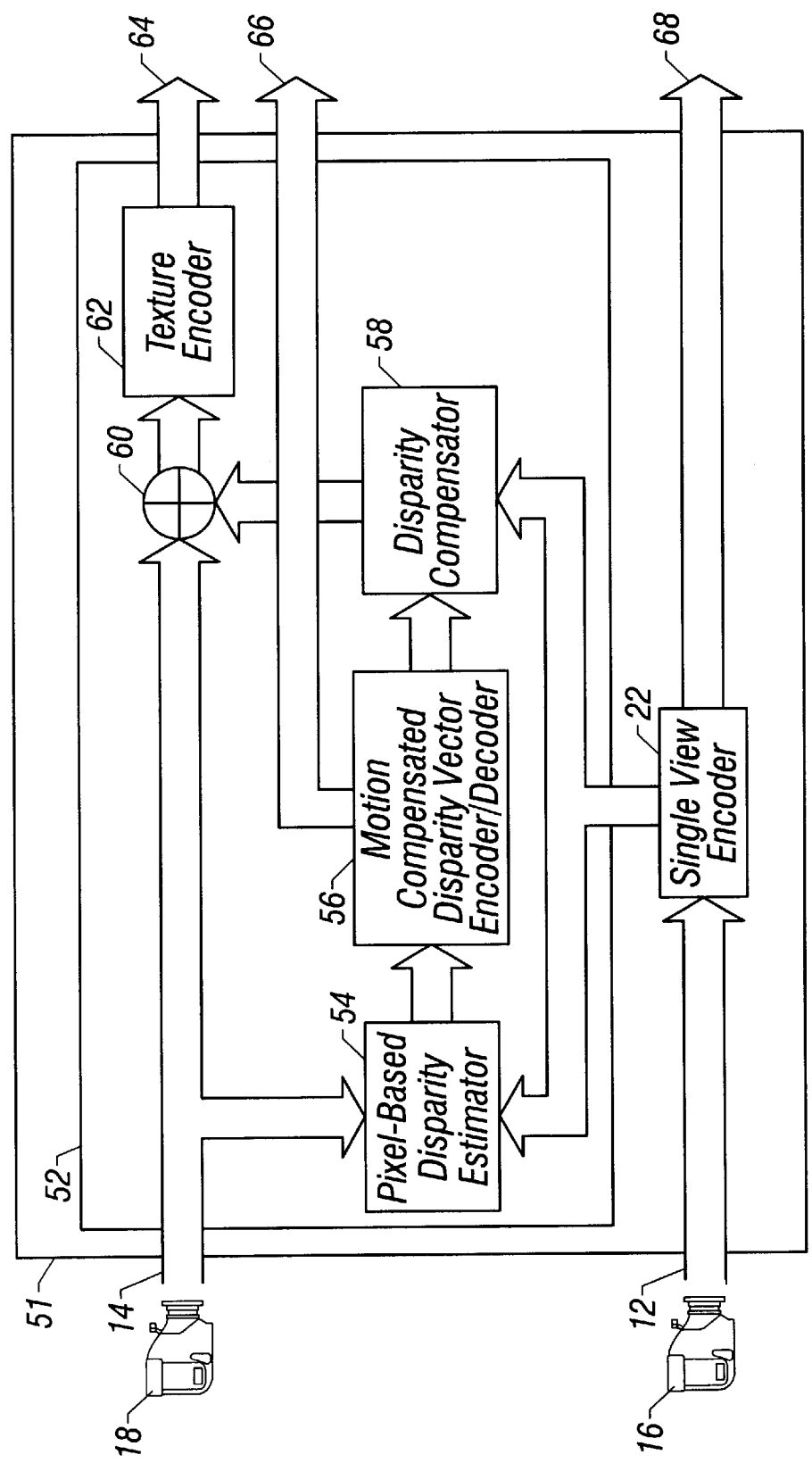
FIG. 3 illustrates an alternative embodiment of the invention that is a variation on that embodiment illustrated in FIG. 1.

FIG. 3 illustrates one particular embodiment of that disclosed in FIGS. 1–2B. This particular embodiment uses the single-view encoder 22 of the embodiment in FIG. 1 and receives data streams 12 and 14 from cameras 16, 18 as in the embodiment of FIG. 1. However, the encoder 52 is a modified version of the encoder 20 in FIG. 1. The pixel-based disparity estimator 54 may be such as that illustrated in the apparatus 10 FIG. 1 and the motion compensated disparity vector in encoder/decoder 56 may be the same as that illustrated in FIGS. 2A–2B. However, the encoded disparity vector field is decoded and used in the disparity compensator 58 to predict the independent view's frame from the dependent view. To this end, the adder 60 receives the output of a disparity compensator 58, which is the predicted frame, and the actual original frame from the data stream 14. The residual is then transmitted to the texture encoder 62 which then transmits it from the apparatus 51.

The apparatus 51 includes three output channels 64, 66, and 68. Channel 64 carries the encoded residual data, channel 66 carries the encoded disparity vector field, and channel 68 carries the encoded dependent view data stream. Typically, the information from these three channels is multiplexed and then subsequently transmitted.

Figure 4:
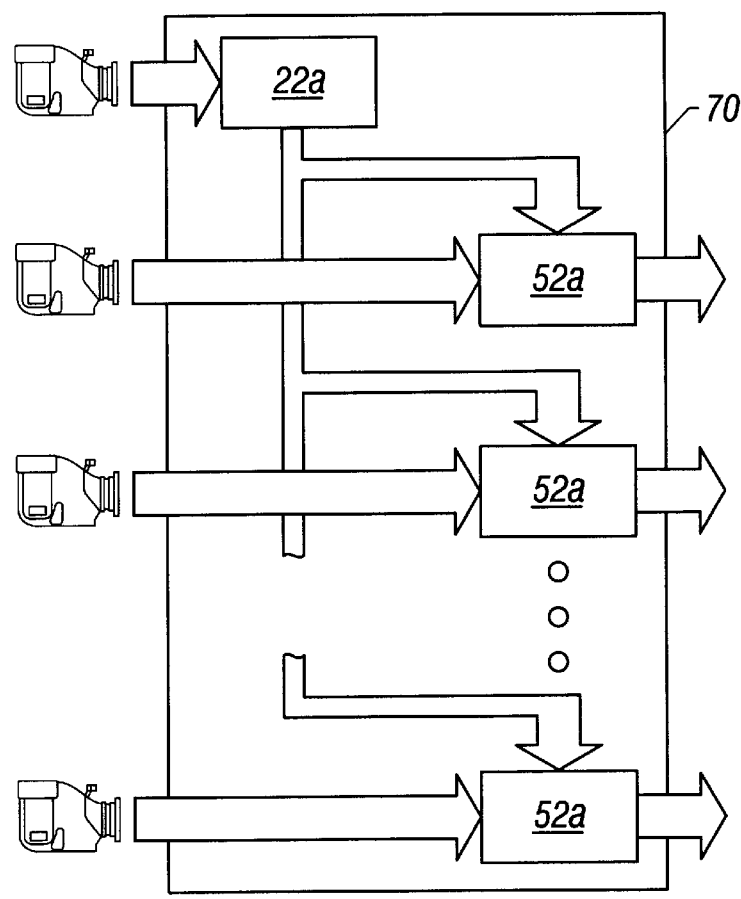
FIG. 4 illustrates an alternative embodiment of the invention in which several of the disparity compensated encoders of the embodiments in FIG. 1 are employed in parallel.
Figure 5:
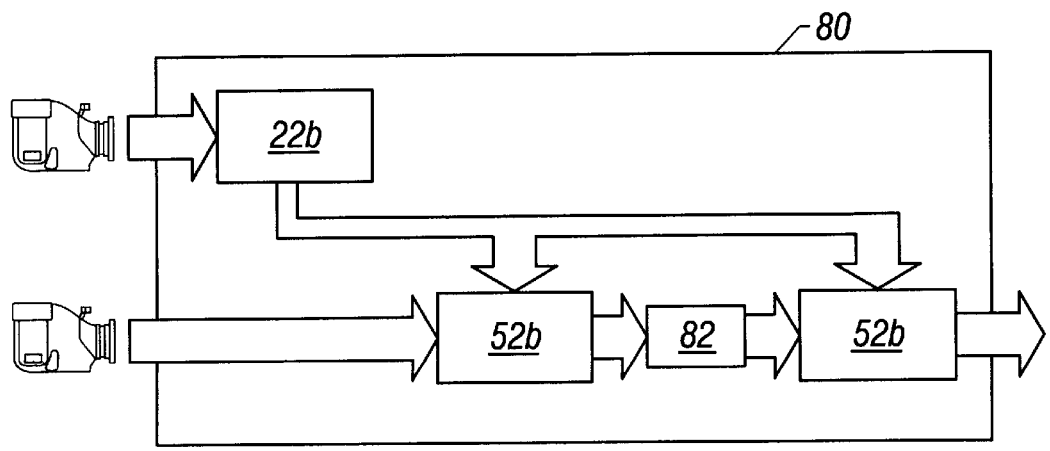
FIG. 5 illustrates one alternative embodiment in which the disparity compensated encoder of the embodiment in FIG. 1 are employed in series.
Figure 6:
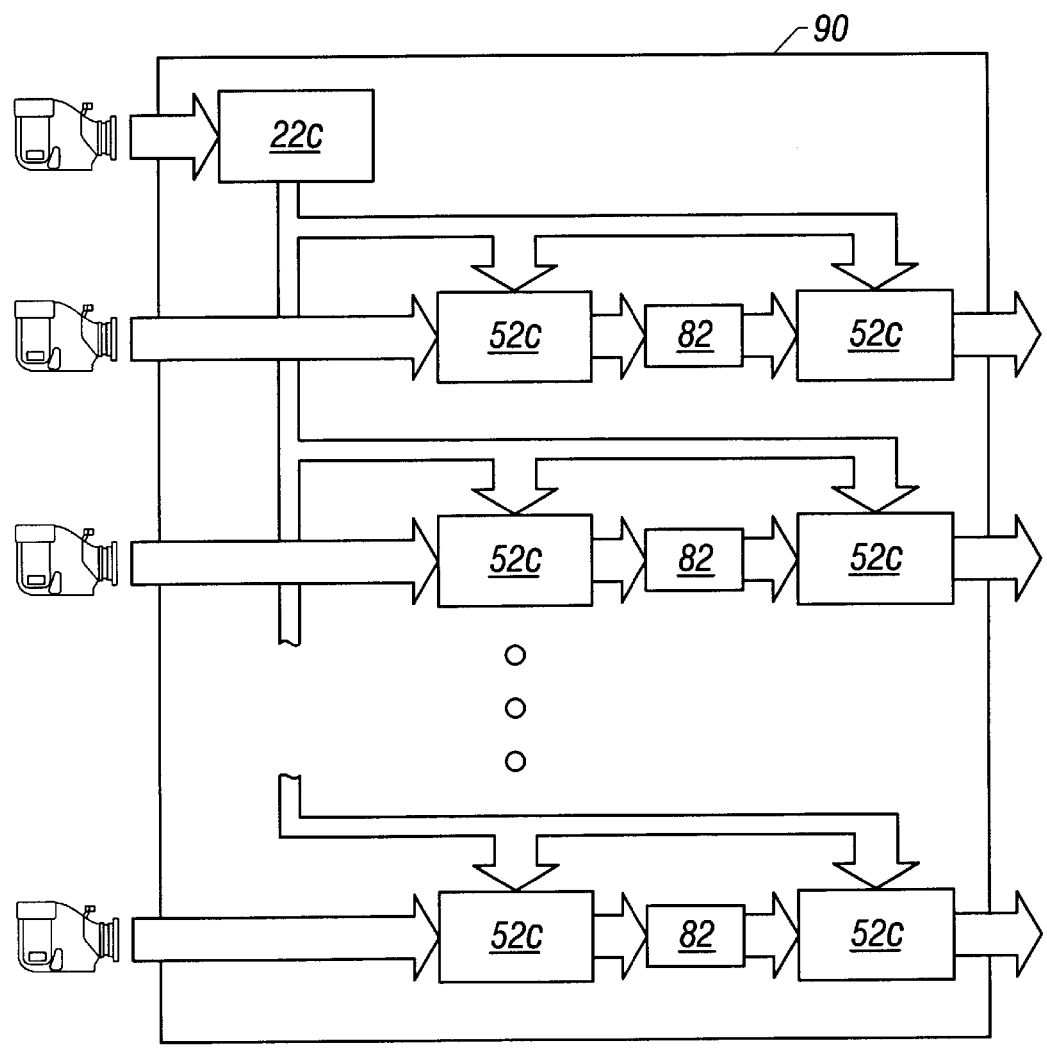
FIG. 6 represents a third alternative embodiment wherein the disparity compensated encoder of the embodiment of FIG. 1 are employed in both parallel and in series.

FIGS. 5–7 illustrate alternative embodiments wherein data from additional views is incorporated by employing codecs in parallel, in a series, and in a combination of both. FIG. 4 depicts an apparatus 70 in which a single-view encoder 22A outputs its encoded data to several codecs 52A in parallel, the encoded output of the codecs 52A being transmitted down channel. FIG. 5 illustrates in an apparatus 80 in which a single-view encoder 22B outputs its encoded data to encoders 52B arranged in series. Because the encoders 52B are designed to receive unencoded input and output encoded data, the output of the first encoder 52B must be decoded by decor 82 before the data is input to the second encoder 52B. FIG. 6 illustrates an apparatus 90 in which the apparatus 70 of FIG. 4 and the apparatus 80 of FIG. 5 are combined such that codecs 52C are employed in both series and parallel as shown.

What is claimed is:

1. An apparatus for compressing multi-view video data from a first view and a second view, the apparatus comprising:
    a first encoder receiving a first set of video data from the first view, encoding the first set of video data, and transmitting the encoded first set of video data;
    a second encoder including:
        an estimator receiving the encoded first set of video data from the first encoder, receiving a second set of video data from the second view, generating a pixel-based disparity vector field from the received first and second sets of video data, and transmitting the disparity vector field; and
        a codec receiving the vector disparity field from the estimator, encoding the received disparity vector field with motion compensated disparity, and transmitting the encoded disparity vector field.

2. The apparatus of claim 1, wherein the codec comprises:
    a motion estimator receiving a first component of the disparity vector field and a corresponding reconstructed component from a previous frame;
    a motion compensator receiving the output of the motion estimator;
    a first adder summing the first component and the output of the motion compensator and outputting the residual thereof;
    a third encoder texture encoding the residual;
    a texture decoder decoding the texture encoded residual and outputting the decoded residual;
    a second adder summing the decoded residual and the output of the motion compensator and outputting the result thereof;
    a memory receiving the result and outputting the reconstructed component to the estimator.

3. The apparatus of claim 1, wherein the second encoder further includes:
    a disparity compensator receiving the decoded, motion compensated, disparity vector field;
    an adder receiving the video data from the second view, receiving the output of the disparity compensator, and outputting the residual thereof; and
    a texture encoder receiving the residual output by the adder, texture encoding the residual and outputting the encoded residual.

4. The apparatus of claim 1, wherein the first encoder employs a DCT technique to encode the first set of video data.

5. The apparatus of claim 1, further comprising a third encoder including:
    a second estimator receiving the encoded first set of video data from the first encoder, receiving a third set of video data from a third view, generating a second pixel-based disparity vector field from the received first and third sets of video data, and transmitting the second disparity vector field; and
    a second codec receiving the second vector disparity field from the second estimator, encoding the received second disparity vector field with motion compensated disparity, and transmitting the encoded second disparity vector field.

6. The apparatus of claim 1, further comprising:
    a decoder decoding the encoded disparity vector field and transmitting the decoded disparity vector field; and
    a third decoder including:
        a second estimator receiving the decoded disparity vector field first set of video data from the first encoder, receiving a third set of video data from a third view, generating a second pixel-based disparity vector field from the received first and third sets of video data, and transmitting the second disparity vector field; and
        a second codec receiving the second vector disparity field from the second estimator, encoding the received second disparity vector field with motion compensated disparity, and transmitting the encoded second disparity vector field.

7. A method for compressing multi-view data, comprising:
    encoding a first set of video data from a first view;
    encoding a second set of video data from a second view, including:
        generating a pixel-based disparity vector field from the encoded first set of data and the second set of video data; and
        encoding the disparity vector field with motion compensated disparity.

8. The method of claim 7, wherein encoding the disparity vector field with motion compensated disparity includes:
    estimating the motion in a first component of the disparity vector field from a corresponding reconstructed component from a previous frame;
    motion compensating the motion estimation of the first component;
    summing the first component and the motion compensation of the first component;
    texture encoding the residual of the summation of the first component and the motion compensation of the first component;
    reconstructing the first component from the texture encoded residual; and
    storing the reconstructed first component.

9. The method of claim 8, wherein reconstructing the first component further includes:
    decoding the texture encoded residual; and
    summing the decoded residual and the motion compensation.

10. The method of claim 8, further comprising:
    disparity compensating the decoded, motion compensated, disparity vector field;
    summing the video data from the second view and the disparity compensation of the decoded, motion compensated, disparity vector field; and
    texture encoding the residual of the summation of the video data from the second view and the disparity compensation of the decoded, motion compensated, disparity vector field.

11. The method of claim 7, wherein encoding the first set of the video data from the first view employs a DCT technique.

12. The method of claim 7, further comprising:
    encoding a third set of video data from a third view, including:

generating a second pixel-based disparity vector field from the encoded first set of data and the third set of video data; and encoding the second disparity vector field with motion compensated disparity.

13. A program storage device programmed with instructions that, when executed by a computer, perform a method for compressing multi-view data, the method comprising:

encoding a first set of video data from a first view;

encoding a second set of video data from a second view, including:

generating a pixel-based disparity vector field from the encoded first set of data and the second set of video data; and encoding the disparity vector field with motion compensated disparity.

14. The program storage device of claim 13, wherein encoding the disparity vector field with motion compensated disparity in the programmed method includes:

estimating the motion in a first component of the disparity vector field from a corresponding reconstructed component from a previous frame;

motion compensating the motion estimation of the first component;

summing the first component and the motion compensation of the first component;

texture encoding the residual of the summation of the first component and the motion compensation of the first component;

reconstructing the first component from the texture encoded residual; and storing the reconstructed first component.

15. The program storage device of claim 14, wherein reconstructing the first component in the programmed method further includes:

decoding the texture encoded residual; and summing the decoded residual and the motion compensation.

16. The program storage device of claim 14, wherein the programmed method further comprises:

disparity compensating the decoded, motion compensated, disparity vector field;

summing the video data from the second view and the disparity compensation of the decoded, motion compensated, disparity vector field; and texture encoding the residual of the summation of the video data from the second view and the disparity compensation of the decoded, motion compensated, disparity vector field.

17. The program storage device of claim 13, wherein encoding the first set of the video data from the first view in the programmed method employs a DCT technique.

18. The program storage device of claim 13, wherein the programmed method further comprises:

encoding a third set of video data from a third view, including:

generating a second pixel-based disparity vector field from the encoded first set of data and the third set of video data; and encoding the second disparity vector field with motion compensated disparity.

* * * * *